(12) United States Patent
Chang et al.

(10) Patent No.: US 8,158,304 B2
(45) Date of Patent: Apr. 17, 2012

(54) FORMULATION OF NANO-SCALE ELECTROLYTE SUSPENSIONS AND ITS APPLICATION PROCESS FOR FABRICATION OF SOLID OXIDE FUEL CELL-MEMBRANE ELECTRODE ASSEMBLY (SOFC-MEA)

(75) Inventors: Yang-Chuang Chang, Taoyuan County (TW); Maw-Chwain Lee, Taoyuan County (TW); Chun-Hsiu Wang, Taoyuan County (TW); Tai-Nan Lin, Taoyuan County (TW); Wei-Xin Kao, Taoyuan County (TW)

(73) Assignee: Institute of Nuclear Energy Research, Tiaan Village, Longtan, Taoyuan (TW)

( * ) Notice: Subject to any disclaimer, the term of this patent is extended or adjusted under 35 U.S.C. 154(b) by 938 days.

(21) Appl. No.: 12/177,161

(22) Filed: Jul. 22, 2008

(65) Prior Publication Data
US 2010/0018036 A1    Jan. 28, 2010

(51) Int. Cl.
*H01M 8/00*    (2006.01)
*B05D 5/12*    (2006.01)

(52) U.S. Cl. .................................. 429/535; 427/115

(58) Field of Classification Search .................. 429/535; 29/623.5; 427/115; 502/101, 105; 501/1
See application file for complete search history.

(56) References Cited

U.S. PATENT DOCUMENTS

| | | | | |
|---|---|---|---|---|
| 5,494,700 | A * | 2/1996 | Anderson et al. ............. | 427/115 |
| 2003/0003237 | A1 * | 1/2003 | Seabaugh et al. ............. | 427/421 |
| 2003/0027033 | A1 * | 2/2003 | Seabaugh et al. ............. | 429/40 |
| 2004/0247791 | A1 * | 12/2004 | Hu et al. ..................... | 427/372.2 |

* cited by examiner

*Primary Examiner* — Ula C. Ruddock
*Assistant Examiner* — Thomas H. Parsons

(57) ABSTRACT

This invention describes the recipe and preparation process of nano-scale electrolyte suspension and its application via a spin coating process for fabrication of airtight/fully dense electrolyte layers composed in solid oxide fuel cell-membrane electrode assembly with high performance characteristics. The recipe of nano-scale electrolyte suspension includes 10~50 wt % nano-scale electrolyte powder, 0.01~1 wt % poly acrylic acid (PAA as dispersant), 0.1~5 wt % poly vinyl alcohol (PVA as binder), 0.005~1 wt % octanol as defoamer, and deionized water as solvent. Solid oxide fuel cell fabricated via this recipe and process exhibits that the open-circuit voltage (OCV) is over 1 Volt, and maximum power density is 335 mW/cm$^2$ at 800° C.

6 Claims, 6 Drawing Sheets

(a)

(b)

FORMULATION OF NANO-SCALE ELECTROLYTE SUSPENSIONS AND ITS APPLICATION PROCESS FOR FABRICATION OF SOLID OXIDE FUEL CELL-MEMBRANE ELECTRODE ASSEMBLY (SOFC-MEA)

BACKGROUND OF THE INVENTION

1. Field of the Invention

The invention relates to the preparation and the application for a suspension that contains the nano-scale electrolyte of YSZ (yttria stabilized zirconia)/GDC (Gd doped ceria)/LSGM (strontium and magnesium doped lanthana gallat) and is used to produce membrane electrode assembly (MEA) of solid oxide fuel cells (SOFC). Through spin coating technology, solid oxide fuel cell-membrane electrode assembly with airtight/fully dense electrolyte layers can be produced to possess high electrochemical property, durability and high degradation resistance. The attributes of the manufacturing process include low cost, high reliability and mass production capability.

2. Description of the Prior Art

With rising oil price and growing consciousness of environmental protection, renewable energy technology is one of the most important technologies in the century. Solid oxide fuel cell is a power generation system with high efficiency, low pollution and diversified energy source. It has become the power generation system that has the most development potential because its features like simple material composition, modulized structure and stable and sustainable power generation. Among all, planar solid oxide fuel cells can overcome long circuit loss and exhibit uniform current collection and therefore can increase cell power density. Planar solid oxide fuel cells are the primary target of research and development for many research groups presently.

The raw materials for solid oxide fuel cells are all ceramic powders of solid oxides. Taking Anode Supported Cell (ASC) as an example, the primary cell type under research uses NiO+YSZ as anode material, YSZ as electrolyte material, and LSM/LSCF as cathode material. Many literatures indicate that because nano-scale ceramic powders have high specific surface area to achieve fully dense ceramic structure under a low sintering temperature. In the manufacturing process for solid oxide fuel cells, low sintering temperature can lower cost, improve planarity of anode supported cell substrate, decrease growth of nickel crystal grains, effectively increase solid oxide fuel cell performance and lower production cost.

Many literatures have proposed diverse production technologies for nano-scale powders, such as gas-phase combustion, spray-drying, sol-gel and hydrothermal. The hydrothermal technology has many advantages in the preparation of nano-scale ceramic powders because it does not use organic solvents, does not need additional sintering process, have excellent control of chemical composition and possess continuous mass production capability.

Currently in a typical SOFC-MEA production process, the anode supported cell substrate is fabricated by tape casting technique first for green tape and then completed by high temperature calcination/sintering. Cathode layer is usually prepared by screen printing technique. Most of the anode supported cell substrates and cathode layers have porous structure. To increase cell performance and lower operation temperature, YSZ electrolyte layer needs airtight/fully dense membranes. Thus, it is very important to develop a technique to coat electrolyte layers onto a porous anode substrate.

Siemens-Westinghouse uses electrochemical vapor deposition (EVD) technique to prepare airtight/fully dense electrolyte layers and successfully apply them to tubular SOFC system. However, this technique needs special equipment and process, so its production cost is high. Alternative techniques have been proposed, such as Plasma-Spray, Sputtering Coating, Sol-Gel, and Spin Coating etc. Among these, Plasma-Spray and Sputtering Coating still have high production cost. Sol-Gel technique has difficulties in preparing fully dense layers onto a porous substrate and would increase defect rate and quality control cost. Spin Coating technique has low equipment cost, simple production process and high reliability, so it has many advantages in preparing airtight/fully dense electrolyte layers.

Presently the key technique for spin coating is how to obtain a well-dispersed suspension as coating material. Nano-scale ceramic powders have small size, high surface energy and tendency to agglomerate during preparation, storage and use. Agglomeration in ceramic powders is disadvantageous to uniformity and densification, which would lead to additional crystal grain growth to induce sintering stress or pore formation that is harmful to the preparation of airtight/fully dense electrolyte layers.

In a suspension, agglomeration in nano-scale powders occurs due to inter-particle Van der Waals attractive forces, but can be overcome by inter-particle electrostatic repulsive forces. The particle electrostatic field is zeta potential, which can be adjusted by the pH value of suspension. The higher zeta potential is the higher electrostatic repulsive force is. Although at an extreme pH value (high acidity or high basicity) there is high zeta potential, the ionic strength of suspension is also high and therefore particles are close to each other and agglomeration can occur.

Another method is to increase inter-particle stereo-hindrance to achieve dispersion of nano-scale ceramic powders. This method is to add suitable polymer dispersant in the suspension, so the polymer dispersant will completely cover the particle surface and prevent agglomeration due to inter-particle contact.

Hence, it is required that the membrane from a spin coating process does not crack during drying. Thus, the suspension needs a suitable binder, such as polyvinyl alcohol (PVA) and methyl cellulose water-soluble type binder etc.

Therefore, the invention proposes a formulation and a process for a nano-scale electrolyte (YSZ/GDC/LSGM) suspension, and the application of the suspension by spin coating technique to prepare airtight/fully dense electrolyte layers with advantages like low production cost, high reliability and mass production capability.

SUMMARY OF THE INVENTION

The primary objective for the invention is to propose a formulation (recipe) and a process for nano-scale electrolyte (YSZ/GDC/LSGM) suspension, and the application of the suspension by spin coating technique to prepare airtight/fully dense electrolyte layers for solid oxide fuel cells-membrane electrolyte assembly (SOFC-MEA) with high electrochemical performance and high durability.

The invention contains a formulation and its process, an airtight/fully dense electrolyte layer manufacturing process and a SOFC-MEA manufacturing process. They are described in the following respectively:

1. Formulation and Process for Nano-Scale Electrolyte Suspensions:
   (1) Preparation for Nano-Scale Electrolyte Powders:
   In a preferred embodiment for the invention, the nano-scale ceramic powders are produced by a hydrothermal coprecipitation process. Taking YSZ ceramic powers as an example, the process involves a reaction precursor of an aqueous solution of zirconium nitrate and Yttrium nitrate $ZrO(NO_3)_2$, $Y(NO_3)_3$. The solution pH value needs to be higher than 9.5. The molar ratio for $ZrO_2$ to $Y_2O_3$ is 0.92:0.08 in the finished product. The reaction temperature is 180° C., pressure is about 140 psi and reaction time is 8-24 hours.

(2) Formulation and Process for Nano-Scale Electrolyte Suspension:

In a preferred embodiment for the invention, the nano-scale YSZ ceramic powders is 10~50% by weight, polyacrylic acid (dispersant) is 0.01~1% by weight, PVA (binder) is 0.1~5% by weight, octanol (defoamer) is 0.005~1% by weight, and the solvent is deionized water. The mixture is subject to grinding/dispersing treatment for 1~24 hours for homogenization. $ZrO_2$ beads in 50~100 μm size are used for grinding. After filtration and separation, nano-scale YSZ suspension is obtained.

2. Airtight/Fully Dense Electrolyte Layer Fabrication Process and SOFC-MEA Fabrication Process:

In a preferred embodiment for the invention, the electrolyte layer is coated onto a porous anode supported cell substrate by spin coating and then subject to suitable sintering process before an airtight/fully dense electrolyte layer is obtained. Taking YSZ electrolyte layer as an example, the spin coating process uses self-prepared nano-scale YSZ suspension and is divided into three stages: the first stage speed at 100~800 rpm, coating time in 6 seconds; the second stage speed at 1000~2000 rpm, coating time in 40 seconds; the third stage speed at 2000~3000 rpm, coating time in 6 seconds. The sintering temperature is 1450° C. and the holding temperature is 1390° C. (preferably for 15 hours). The temperature increase rate is 0.5~3° C./min and the temperature decrease rate is 1~3° C./min.

DETAILED DESCRIPTION OF THE EMBODIMENT

Figure 1:
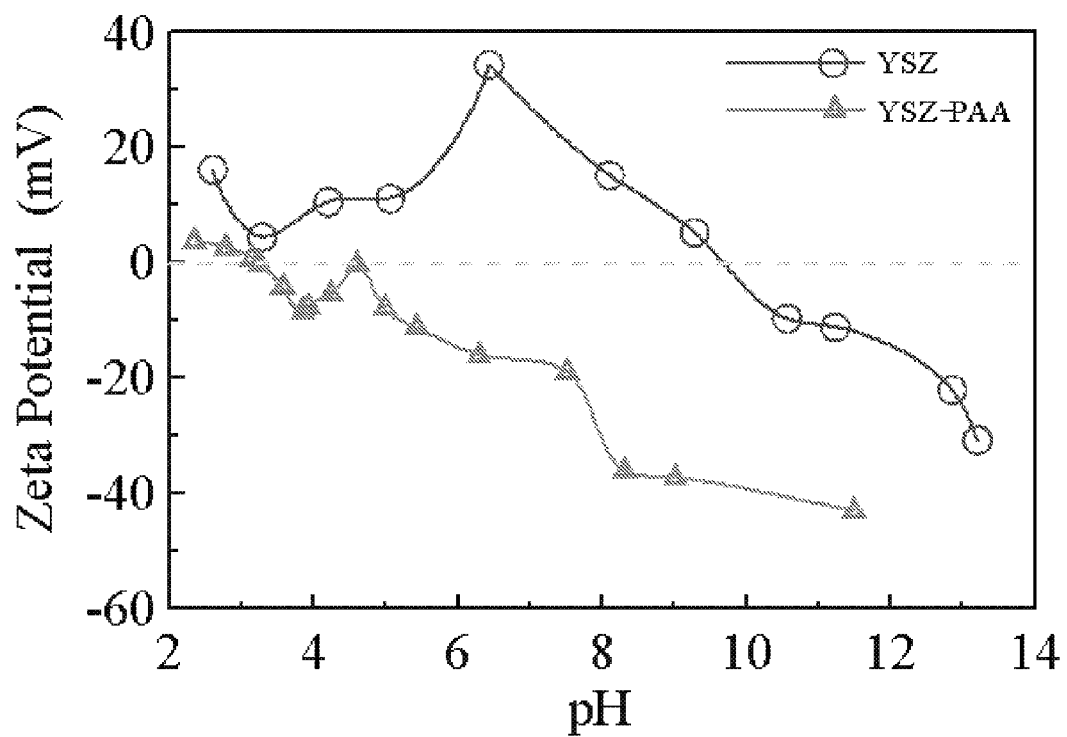
FIG. 1 shows the relationship between solution pH value and particle zeta potential.

The invention relates to the preparation and the application for a suspension that contains the nano-scale electrolyte of YSZ/GDC/LSGM and is used to produce solid oxide fuel cells. Through spin coating technology, solid oxide fuel cell-membrane electrode assembly with airtight/fully dense electrolyte layers can be produced with high electrochemical property and durability. The manufacturing process has advantages of low cost, high reliability and mass production capability. The invention will be described in details in the following.

For the formulation and process for the nano-scale electrolyte suspension there are at least the following steps in the invention:

Step a: Hydrothermal Coprecipitation Process to Prepare Nano-Scale YSZ Ceramic Powders A solution mixture of zirconium nitrate and yttrium nitrate is added with ammonium and placed into an autoclave for a reaction temperature at 180° C. and reaction time in 8-24 hours. After separation and drying, the finished product is nano-scale YSZ ceramic powders with 100% cubic crystal structure and 92 mol. % $ZrO_2$ and 8 mol. % $Y_2O_3$ in composition.

Step b: Preparation of Nano-Scale Electrolyte Suspensions with Different Solid Contents The suspension compositions contain nano-scale YSZ ceramic powders, polyacrylic acid (dispersant), PVA (binder), octanol (defoamer) and deionized water (solvent) (named as mixture solution).

Step c: Homogenization of the Mixture Solution by Grinding/Dispersing Treatment

The homogenization proceeds for 1~24 hours with $ZrO_2$ beads in 50~100 μm size. After filtration and separation, nano-scale YSZ suspension can be obtained.

For the fabrication process of the airtight/fully dense electrolyte layers and SOFC-MEA there are at least the following steps in the invention:

A. Airtight/Fully Dense Electrolyte Layer Fabrication Process:

Step d: Fix the center of an anode substrate onto the spin coater. Test running at 30 rpm to assure the substrate is firmly placed on the spin coater.

Step e: The spin coating process has three stages: (1) put a suitable amount of suspension onto the anode substrate surface and run the spin coater at 150~800 rpm for 6 seconds; (2) distribute the suspension evenly onto the anode substrate surface and run the spin coater at 1000~2000 rpm for 30~60 seconds; (3) put the suspension onto the anode substrate surface and run the spin coater at 2000~3000 rpm for 6 seconds.

Step f: Put the coated half-cell in an oven at 80° C. Repeat Step d and Step e for about eight times to complete the electrolyte coating process.

Step g: Put the completed half-cell in a high-temperature furnace for sintering at 1450° C. and hold it at 1390° C. for a long period of time (preferably 15 hours). The temperature increase rate is 0.5~3° C./min and the temperature decrease rate is 1~3° C./min. After sintering, ceramic half-cell of airtight/fully dense YSZ electrolyte layers can be obtained (abbreviation: HC-fd).

B. SOFC-MEA Fabrication Process:

Step h: Fix the half-cell (HC-fd) onto a screen printer by vacuum operation. Adjust it to a suitable coating thickness, scraper pressure and scraper speed.

Step I: Put a suitable amount of LSM paste on the screen. Run the scraper for several times to coat the paste evenly onto the half-cell. Leave and set the half-cell in an oven at 80° C.

Step j: Put the solid oxide fuel cell with completed cathode coating in a high-temperature furnace for sintering at 1100° C. for 3 hours. The temperature increase rate and the temperature decrease rate are both 1° C./min. Thus a high-performance solid oxide fuel cell-membrane electrode assembly (cell: SOFC-MEA) can be obtained.

Step k: Conduct SEM microstructure analysis and electrolyte gas permeability test for the completed SOFC-MEA to assure the fully dense/airtight electrolyte layers. Run electrical performance test and cell power density test for the cell.

Embodiment (1) Formulation and Fabrication Process for Nano-Scale Electrolyte Suspensions Step a: In a preferred embodiment for the invention, the nano-scale ceramic powders are produced by a hydrothermal coprecipitation process. The process involves a reaction precursor of an aqueous solution of zirconium nitrate and Yttrium nitrate $ZrO(NO_3)_2$, $Y(NO_3)_3$ in a controlled amount. The molar ratio for $ZrO_2$ to $Y_2O_3$ is 0.92:0.08 in the finished product. The solution pH value is higher than 9.5 after a suitable amount of ammonium is added. Then, white precipitates occur in the solution. The slurry is put in an autoclave at a temperature of 180° C. and a pressure of 140 psi for a reaction time of 8-24 hours. When the reaction is completed, the powders are collected and rinsed with deionized water for several times. After drying, nano-scale YSZ ceramic powders are obtained. Depending on needs, the YSZ ceramic powders are subject to calcination at 600~900° C. to prepare ceramic powders in different particle sizes. The physical properties for the YSZ ceramic powders are listed in Table 1 and Table 2.

TABLE 1

Physical Properties for YSZ Ceramic Powders by Hydrothermal Coprecipitation Process

| Reaction Time (hours) | Surface Area $(S_{BET})(m^2/g)$ | True Density $(\rho)(g/cm^3)$ | $D_{XRD}$ (nm) | $D_{BET}$ (nm) | $D_{DLS}$ (nm) |
|---|---|---|---|---|---|
| 1 | 182.93 | 4.6455 | 4.9 | 7.06 | 195.55 |
| 2 | 168.24 | 4.1653 | 4.6 | 8.56 | 190.25 |
| 4 | 176.99 | 4.3265 | 4.5 | 7.84 | 259.84 |
| 8 | 175.99 | 4.4449 | 4.2 | 7.67 | 271.72 |
| 12 | 139.37 | 4.2524 | 4.3 | 10.12 | 253.75 |
| 20 | 129.64 | 4.1684 | 3.8 | 11.10 | 227.91 |
| 24 | 105.46 | 4.1413 | 3.9 | 13.74 | 278.43 |

TABLE 2

Physical Properties for YSZ Ceramic Powders at Different Calcination Temperatures

| Calcinated temp. (° C.) | Surface Area $(S_{BET})(m^2/g)$ | True Density $(\rho)$ $(g/cm^3)$ | $D_{BET}$ (nm) |
|---|---|---|---|
| 0 | 175.99 | 4.4449 | 7.67 |
| 600 | 94.74 | 5.1232 | 12.36 |
| 700 | 64.38 | 5.4040 | 17.25 |
| 800 | 39.35 | 5.7618 | 26.46 |
| 900 | 19.00 | 5.9236 | 53.31 |

Afterward, a zeta potential analyzer is used to analyze the surface characteristics for the YSZ ceramic powders. FIG. 1 shows the relationship between the solution pH value and particle zeta potential. The Y-axis represents zeta potential (mV) and X-axis represents solution pH value. The hollow circle represents the YSZ ceramic powder by hydrothermal coprecipitation process while the triangle represents the YSZ ceramic powder after surface modification by PAA polymer. From FIG. 1, it is known that the isoelectrical point for the unmodified YSZ ceramic powders is 9.75, indicating particle surface charge is zero when the solution pH value is 9.75. At this time, agglomeration of particles tends to occur. However, when the solution is with pH<7 or pH>13, the particle zeta potential can be increased to about 40 mV, which would stabilize the dispersion of particles in the solution. The isoelectrical point for the PAA modified YSZ ceramic powders shifts to 4.75. When pH value is >9, the particle zeta potential can be increased to above 40 mV. Therefore, YSZ ceramic powders with PAA surface modification show better dispersion stability. Another thing worth noting is in an acidic solution, YSZ ceramic powders have poor stability and irregular variation in zeta potentials, which are disadvantageous to suspension preparation.

Step b: Depending on needs, nano-scale electrolyte suspensions with different solid contents can be prepared. The embodiment uses 30% solid content as an example. First, mix in a beaker 100 grams of deionized water, 75 grams of 5% PVA solution, 0.5 grams of 50% PAA solution and 0.21 grams of octanol and agitate the mixture. Add 75 grams of YSZ ceramic powders into the solution and fully agitate it. Then use tetramethylammonium hydroxide (TMAH) to regulate the pH value to above 9.5. This is named YSZ mixture suspension (abbreviation: YSZ-S).

Figure 2:
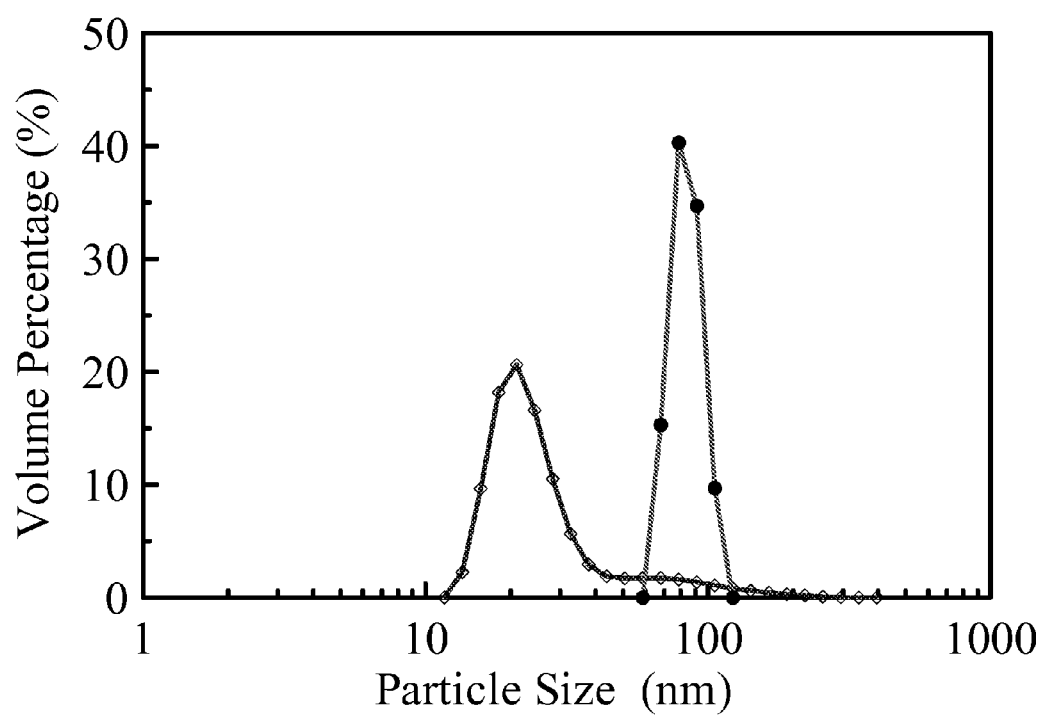
FIG. 2 shows the relationship between YSZ powder size distribution and volume percentage.

Step c: Use special wet type nano grinding equipment. First add 700 grams of $ZrO_2$ beads in 0.1 mm diameter to the grinding tank. Pour the YSZ mixture suspension (YSZ-S) into the grinding tank for grinding at 2500 rpm for 2 hours. Separate the beads and the suspension. In FIG. 2, the line with diamonds represents the YSZ ceramic powders by hydrothermal coprecipitation process while the line with dots represents the suspension of YSZ ceramic powder after high-temperature calcination. The result shows the process can obtain nano-scale YSZ electrolyte suspension.

(2) Airtight/Fully Dense Electrolyte Layer Fabrication Process and SOFC-MEA Fabrication Process A. Airtight/Fully Dense Electrolyte Layer Fabrication Process:

The characterized YSZ electrolyte suspension is coated onto the self-prepared anode supported cell substrate by spin coating. After sintering, airtight/fully dense YSZ electrolyte layers are prepared. The airtight/fully dense YSZ electrolyte layer fabrication process is as follows:

Step d: Fix the center of an anode substrate onto the spin coater. Test running at 30 rpm to assure the substrate is firmly placed on the spin coater.

Step e: The spin coating process has three stages: (1) put a suitable amount of suspension onto the anode substrate surface and run the spin coater at 150~800 rpm for 6 seconds; (2) distribute the suspension evenly onto the anode substrate surface and run the spin coater at 1000~2000 rpm for 30-60 seconds; (3) put the suspension onto the anode substrate surface and run the spin coater at 2000~3000 rpm for 6 seconds.

Step f: Put the coated half-cell in an oven at 80° C. Repeat Step d and Step e for about eight times to complete the electrolyte coating process.

Figure 3:
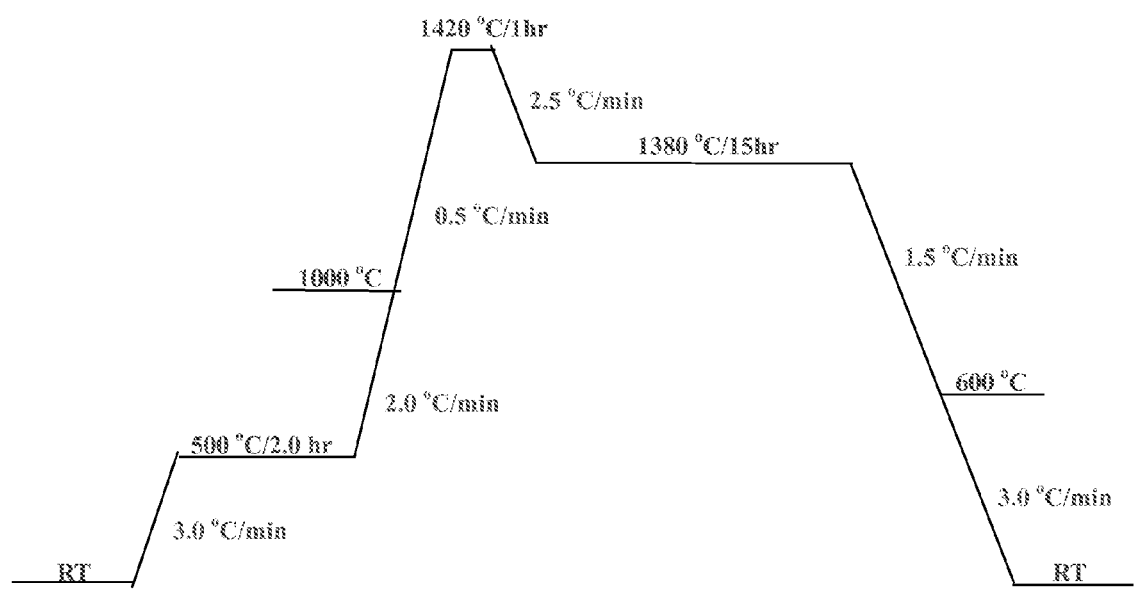
FIG. 3 shows the sintering curve for the YSZ electrolyte from a spin coating process.

Step g: Put the completed half-cell in a high-temperature furnace for sintering at 1450° C. and hold it at 1390° C. for 15 hours. The temperature increase rate is 0.5~3° C./min and the temperature decrease rate is 1~3° C./min. The sintering curve is shown in FIG. 3. After sintering, ceramic half-cell of airtight/fully dense YSZ electrolyte layers can be obtained (abbreviation: HC-fd).

B. SOFC-MEA Fabrication Process:

Screen printing is used to coat the LSM cathode layer onto the completed half-cell (HC-fd). After sintering, a solid oxide fuel cell can be prepared. The process is as follows:

Step h: Fix the half-cell onto a screen printer by vacuum operation. Adjust it to a suitable coating thickness, scraper pressure and scraper speed.

Step i: Put a suitable amount of LSM paste on the screen. Run the scraper for several times to coat the paste evenly on the half-cell. Leave and set the half-cell in an oven at 80° C.

Step j: Put the solid oxide fuel cell with completed cathode coating in a high-temperature furnace for sintering at 1100° C. for 3 hours. The temperature increase rate and the temperature decrease rate are both 1° C./min.

Step k: Through the above steps, a solid oxide fuel cell (unit cell) can be obtained. SEM microstructure analysis and electrolyte gas permeability test for the completed SOFC-MEA are conducted to assure the fully dense/airtight electrolyte layers. Electrical performance test and cell power density test are run to characterize the cell.

Figure 4:
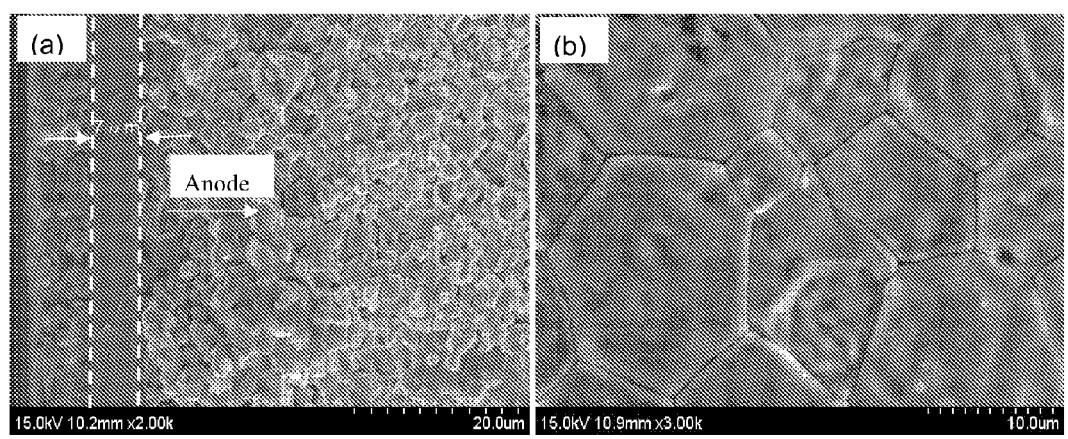
FIG. 4 shows the SEM picture for the solid oxide fuel cell microstructure: (a) cross-sectional view for full cell, (b) planar (surface) view for electrolyte.
Figure 5:
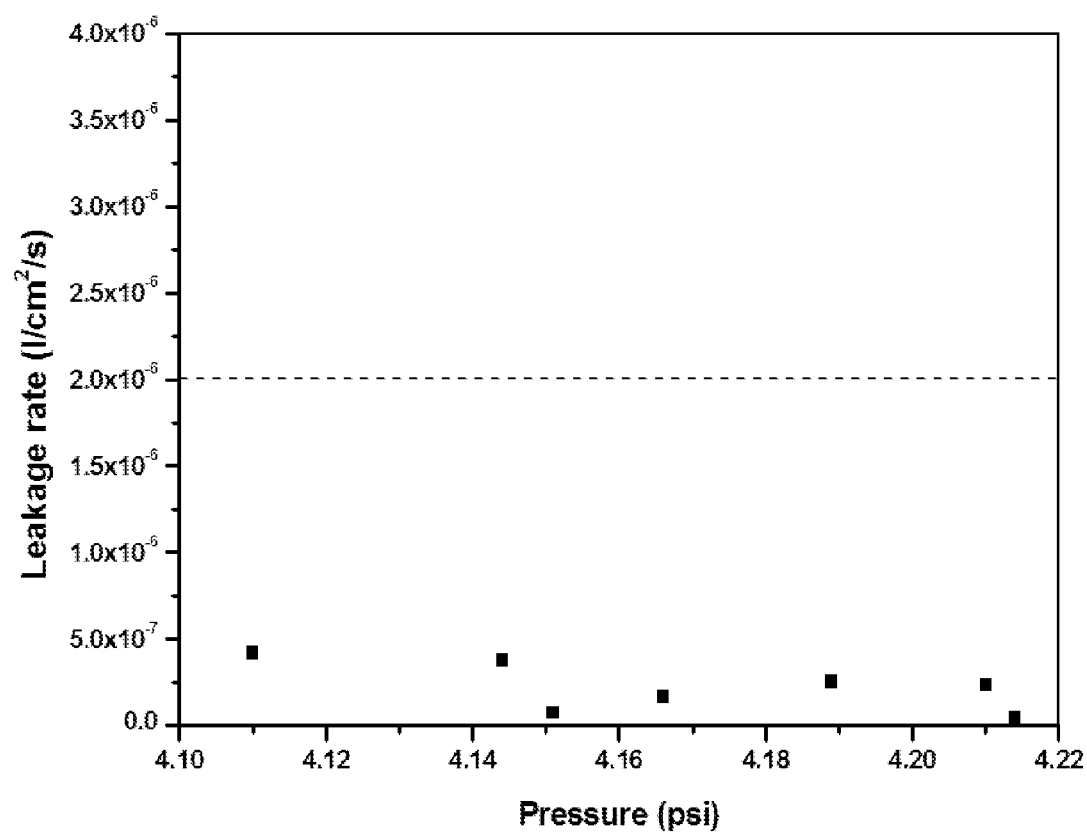
FIG. 5 shows the relationship between gas permeability and pressure difference for the solid oxide fuel cell.

SEM is used to characterize the solid oxide fuel cell structure. FIG. 4(a) shows the crossectional diagram for a full solid oxide fuel cell. The electrolyte layer thickness shown in the figure is about 7 μm and the layer has good adhesion to the cathode and the anode. The SEM picture shows no porous structure on the surface and therefore the cell can achieve fully dense/airtight effect (as shown in Figure (b)). On the other hand, a gas permeation analyzer is used to conduct electrolyte airtightness analysis for the obtained solid oxide fuel cell. FIG. 5 shows the relationship between gas permeability and pressure difference for the solid oxide fuel cell. The X-axis represents pressure (psi) while the Y-axis represents gas permeability ($L/cm^2/sec$). From FIG. 5 it is known that the gas permeability for the solid oxide fuel cell falls and fluctuates below $5 \times 10^{-7}$ $L/cm^2/sec$, far lower than the set point for the non-permeation area ($2 \times 10_{-6}$ $L/cm^2/sec$), which proves the electrolyte layer has achieved fully densification to prevent gas permeation. The analytical result is consistent with SEM result. Thus, the nano-scale electrolyte suspension prepared in the above process and the spin coating process can work to obtain airtight/fully dense YSZ electrolyte layers.

Figure 6:
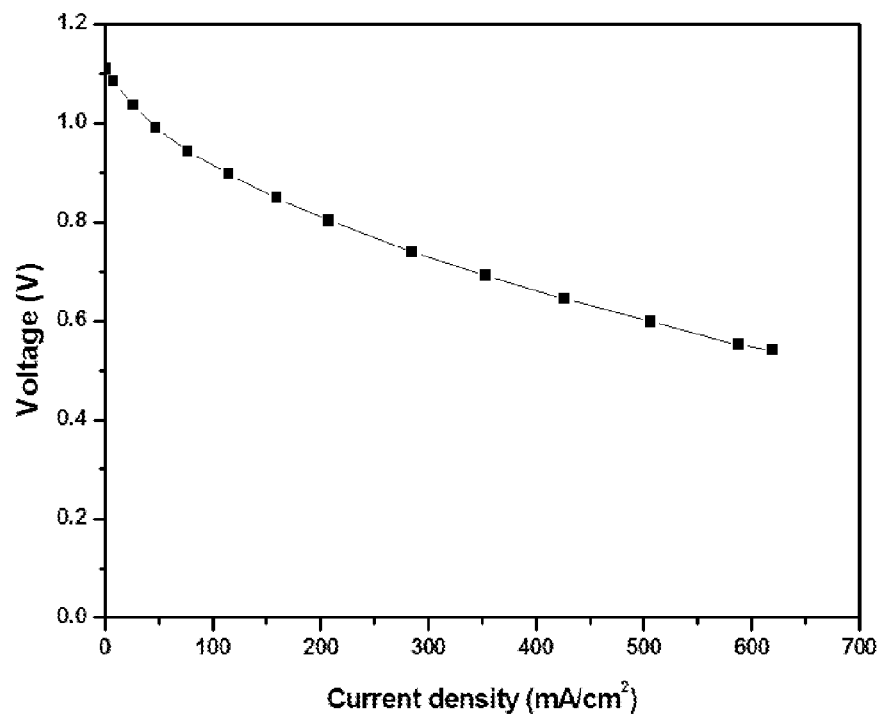
FIG. 6 shows the electrical properties for the solid oxide fuel cell: (a) relationship between electrical current and voltage, (b) relationship between current density and power density.
Figure 6:
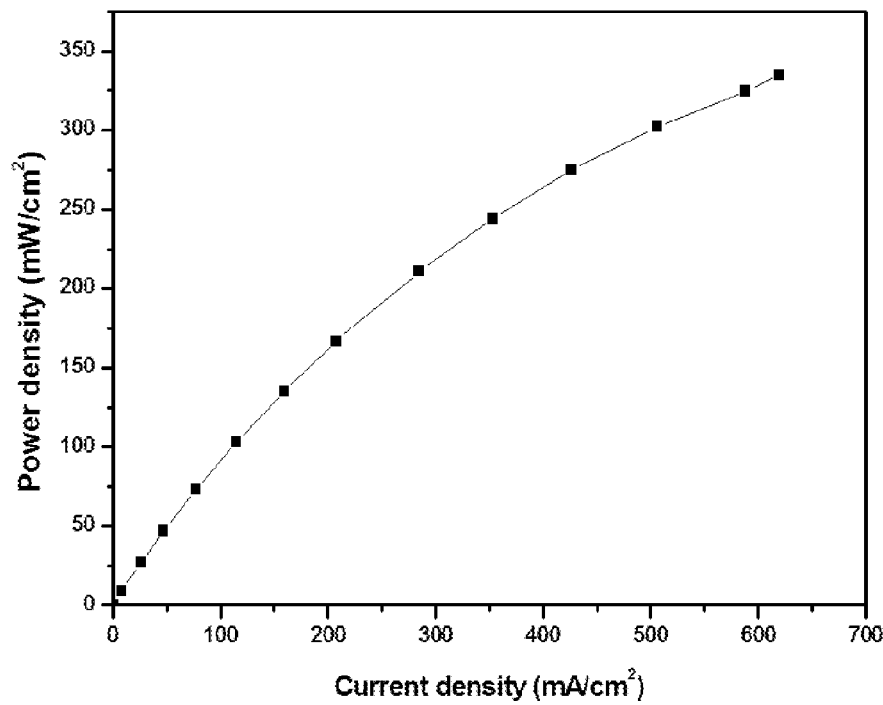

The result for the solid oxide fuel cell that has been tested by the equipment established in Nuclear Energy Research Institute is shown in FIG. 6(a), which indicates the relationship between current density and voltage of the solid oxide fuel cell. The X-axis represents current density ($mA/cm^2$), while the Y-axis represents voltage (V). It is known from the result that at 800° C. the maximum open-circuit voltage (OCV) can reach 1.11V, indicating the solid oxide fuel cell has achieved airtightness. FIG. 6(b) shows the relationship between current density and power density of the solid oxide fuel cell. The X-axis represents current density ($mA/cm^2$), while the Y-axis represents power density ($mW/cm^2$). It is known from the result that at 800° C. the maximum power density can reach 335 $mW/cm^2$. The invention has proved that it meets the patent application requirements in excellence, necessity, innovation and technical importance, and thus an application has been filed accordingly.

What is claimed is:

1. A formulation and application process for nano-scale electrolyte suspension for the fabrication of a solid oxide fuel cells-membrane electrolyte assembly (SOFC-MEA) comprising the steps of:

(1) A formulation and a fabrication process for nano-scale electrolyte suspension comprising steps:

Step a: using a hydrothermal co-precipitation process to prepare a nano-scale YSZ ceramic powders with 100% cubic crystal structure;

Step b: mixing the nano-scale YSZ ceramic powder 10~50% by weight, PAA 0.01~1% by weight, PVA 0.1~5% by weight, octanol 0.005~1% by weight, and deionized water as solvent;

Step c: preparing the nano-scale electrolyte suspension is as follows: the mixture from Step b is subject to homogenization by grinding/dispersing treatment for 1~24 hours with $ZrO_2$ beads in 50~100 μm as grinding beads, and after filtration and separation, nano-scale YSZ suspension is obtained;

(2) The process to apply the nano-scale YSZ suspension to fabricate SOFC-MEA is as follows:

A. The airtight/fully dense electrolyte layer fabrication process comprising steps:

Step d: fixing the center of an anode substrate onto spin coater, test running at 30 rpm to assure the substrate is firmly placed on the spin coater;

Step e: The spin coating process has three stages: (1) putting a suitable amount of suspension onto the anode substrate surface and running the spin coater at 150~800 rpm for 6 seconds; (2) distributing the suspension evenly onto the anode substrate surface and running the spin coater at 1000~2000 rpm for 30~60 seconds; (3) putting the suspension onto the anode substrate surface and running the spin coater at 2000~3000 rpm for 6 seconds, and spinning off the residual solvent to obtain green tape electrolyte half-cell;

Step f: putting the coated half-cell in an oven at 80° C. and repeating Step d and Step e for about eight times to complete the electrolyte coating process;

Step g: putting the completed half-cell in a high-temperature furnace for sintering at 1450° C. and holding it at 1390° C. for 15 hours while the temperature increase rate is 0.5~3° C./min and the temperature decrease rate is 1~3° C./min, and after sintering, a ceramic half-cell of airtight/fully dense YSZ electrolyte layers is obtained;

B. SOFC-MEA fabrication process at least comprising steps:

Step h: fixing the half-cell onto a screen printer by vacuum operation, and adjusting it to a suitable coating thickness, scraper pressure and scraper speed;

Step i: putting a suitable amount of LSM paste on the screen and running the scraper for several times to coat the paste evenly onto the half-cell, and leaving and setting the half-cell in an oven at 80° C.;

Step j: putting the solid oxide fuel cell with completed cathode coating in a high-temperature furnace for sintering at 1100° C. for 3 hours, while the temperature increase rate and the temperature decrease rate are both 1° C./min., thus a solid oxide fuel cell-membrane electrode assembly is obtained; and Step k: conducting SEM microstructure analysis and electrolyte gas permeability test for the completed SOFC-MEA.

2. The process according to claim 1, wherein the hydrothermal coprecipitation process in Step a is operated with solution pH value higher than 9.5, reaction temperature at 180° C., pressure at 140 psi and reaction time in 8-24 hours.

3. The process according to claim 1, wherein the nano-scale electrolyte suspension formulation in Step b contains nano-scale electrolyte powders, dispersant, binder, defoamer and solvent and the electrolyte is YSZ, GDC, LSGM, or SDC (Sm doped ceria).

4. The process according to claim 1, wherein the process for the airtight/fully dense electrolyte layer in A process of Item (2) is the same as Step d, e, f; while other parameters like rpm and coating time is adjusted.

5. The process according to claim 1, wherein the cathode material in B process of Item (2) is LSM or LSCF.

6. The process according to claim 1, wherein the equipment to investigate SOFC-MEA microstructure for Step k in B process of Item (2) is SEM; the gas permeability for airtight/fully dense characteristic is less than $2\times10^{-6}$ L/cm$^2$/sec.

* * * * *